April 12, 1966 W. R. LEOPOLD, JR., ET AL 3,245,701
TRANSITION FITTING
Filed Jan. 22, 1963
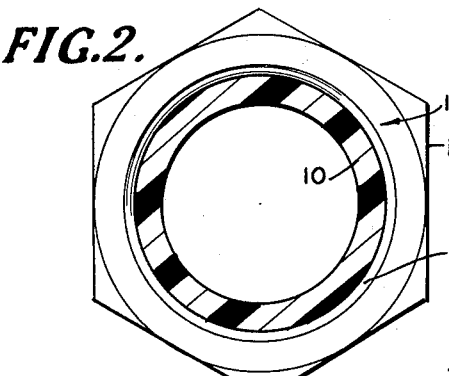
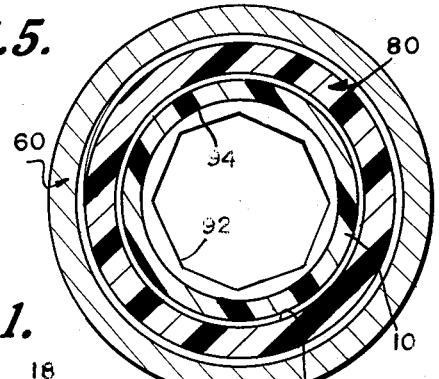
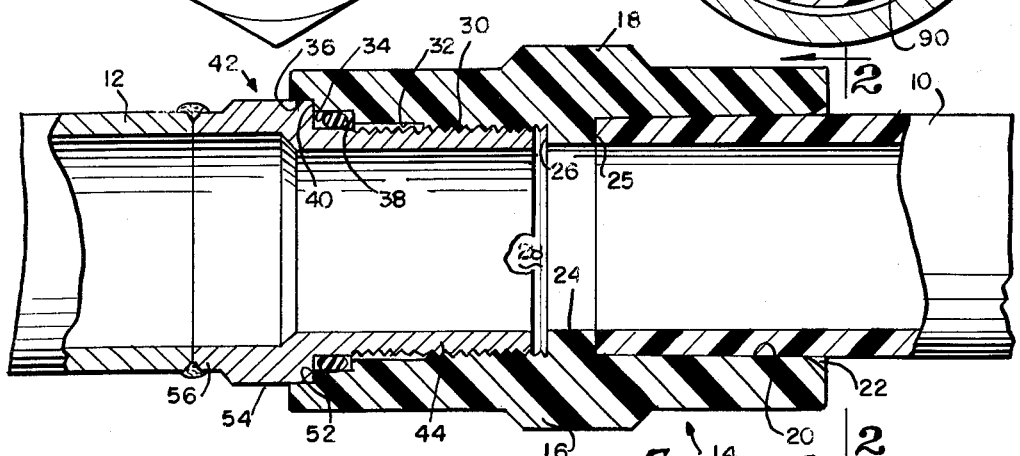
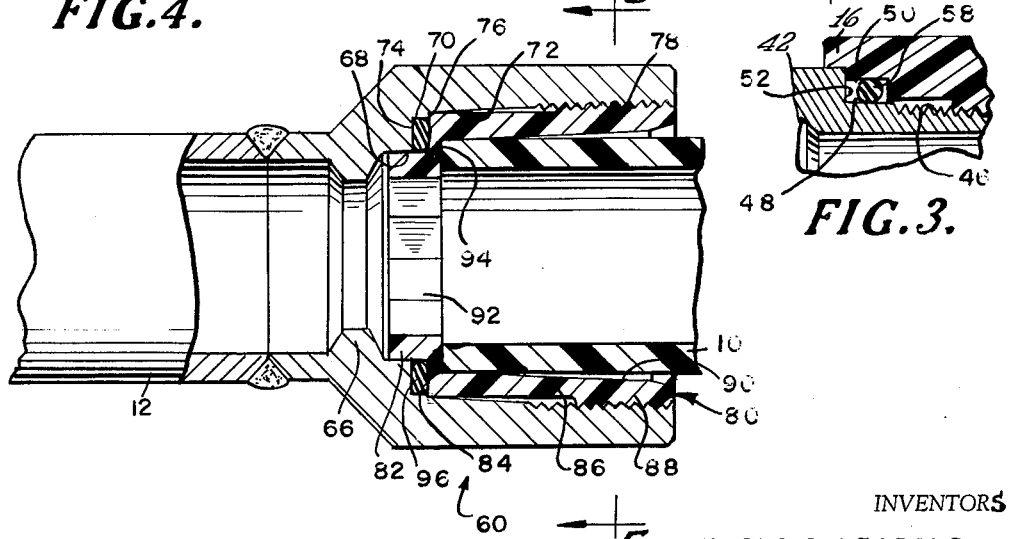
INVENTORS
WILBUR R. LEOPOLD
CARL E. FLOREN
BY Cushman, Darby & Cushman
ATTORNEYS ' # United States Patent Office 3,245,701
Patented Apr. 12, 1966

3,245,701
TRANSITION FITTING
Wilbur R. Leopold, Jr., and Carl E. Floren, Decatur, Ill., assignors to Mueller Co., Decatur, Ill., a corporation of Illinois
Filed Jan. 22, 1963, Ser. No. 253,199
3 Claims. (Cl. 285—174)

This invention has reference to a new and improved joint for connecting metal pipe such as steel to organic plastic pipe.

Among the objects of the present invention are to provide: a new and improved transition joint for connecting the ends of metal and plastic pipes together; a transition joint of the character described which utilizes a new and improved sealing arrangement between a metal coupler and a plastic adapter such that the threads which join the plastic adapter to the metal coupler do not have to be pressure tight, to keep the axial load off the resilient seal, e.g., an O-ring; a transition joint operative to keep exterior moisture from the seal.

Still further, the present invention contemplates the provision of a transition fitting of the character described which is of simple, reliable and trouble-free construction wherein the pipe is solvent welded or fusion welded to a plastic adapter, T, corporation stop, or the like. The adapter, in turn, is threadably engaged with a metal coupler which is welded to the end of the pipe. New and improved means for sealing the adjacent surfaces of these elements is provided and the joint is characterized by a remarkable resistance to pressure and enhanced loading features as well as simplicity of assembly by unskilled workmen in the field.

These and still further objects, advantages, and novel features of the present invention will become apparent in the specification and claims taken in connection with the accompanying drawings.

In the drawings:

FIGURE 1 is a longitudinal section view of a transition joint according to the preferred embodiment of this invention;

FIGURE 2 is a sectional view taken along line 2—2 in FIGURE 1;

FIGURE 3 is an enlarged longitudinal section view of the sealing arrangement;

FIGURE 4 is a longitudinal section view with a modified embodiment of the transition joint, and FIGURE 5 is a view taken along line 5—5 in FIGURE 4.

Referring now to FIGURES 1–3, there is shown the end 10 of a plastic pipe joined to the end 12 of a metal pipe such as steel, by a transition joint 14 according to the preferred embodiment of this invention.

The transition joint 14 includes a generally cylindrical plastic adapter 16 having an octagonal exterior wrench-engaging surface 18 at its center. The adapter 16 has a first smooth bore 20 which receives the end of the plastic pipe 10, the smooth bore 20 terminating at its outer end in a flared surface 22 so that the end of the pipe is slidably received in the smooth bore 20.

Disposed at the central region of the adapter 16 in the inner extremity of the first bore 20 is an inwardly extending shoulder 24 having a radial abutment wall 25 which limits the interior extent of movement of the pipe end 10. Alternatively, the plastic pipe may abut the exterior end of joint 14, and joined thereto by a fusion bond instead of being slipped into the bore 20. In this event, of course, the wall 25 flares outward, in a smooth curve. The shoulder 24 is preferably of the same exterior diameter as the interior diameter of the pipe 10. The opposite radial abutment wall 26 merges with a second bore 28 which is threaded along its inner extent 30. This threaded portion 30 then merges with first, second, and third counterbored portions 32, 34, and 36, respectively, there being provided radial shoulders 38 and 40 between the first and second counterbored portions 32 and 34 and between the second and third counterbored portions 34 and 36, respectively.

A metal coupler 42 of generally cylindrical construction has an exteriorly threaded portion 44 of reduced diameter which is adapted to be threaded into the portion 30 of the second bore 28. This threaded portion 44 terminates at its intermediate end with an outwardly inclined surface 46, then with a short, flat longitudinally extending surface 48 (FIGURE 3), the surfaces 46 and 48 being disposed in spaced apart relationship to the second counterbored portion 34 of the plastic adapter 16 to thereby define an annular space 50 therebetween when the joint is made up. The longitudinally flat surface 48 terminates with a radial shoulder 52 adapted to abut the radial shoulder 40 in the plastic adapter so that the exterior cylindrical surface 54 adjacent this radial shoulder 52 is nested within the third counterbored portion 36 of the adapter 16. The opposite outer end 56 of the metal coupler of reduced exterior diameter 42 is suitably bevelled and joined to the metal pipe end 12 by welding. A resilient sealing gasket, such as an O-ring 58, is received in the annular space 50 between the metal coupler 42 and the plastic adapter 16.

In order to assemble the transition joint in FIGURES 1–3, the metal coupler 42 is welded to the metal pipe 12 and the O-ring 58 is slipped in the adapter 16 adjacent the second counterbored portion 34. The adapter 16 is then threaded onto the exteriorly threaded portion 44 of the metal coupler 42 so that when the joint between these elements is made up, the O-ring is radially compressed according to the radial distance between the surface of the second counterbored portion 34 and the surface 48. The coupler 42 is nested within the third counterbored portion 36 of the adapter 16. This latter arrangement acts as an effective stop shoulder.

The joint between these elements is thereby effected without straining the threaded connection between the elements and the O-ring 58 provides a notably efficient seal without undue stress on the elements. Thus the joint is tight but not so tight as to damage the threads and there is no sacrifice of an efficient seal, the radial compression of the O-ring advantageously providing the desired pressure tight joint. Moreover, the O-ring 58 will be compressed only within the prescribed limits and the compressive stress on the O-ring is not governed by the degree of tightness of the threaded joint between the coupler 42 and the adapter 16. In this regard the plastic pipe end 10 is simply inserted in the first bore 20 of the plastic adapter 16 and solvent welded in place by well-known techniques.

Numerous plastic materials are advantageously utilized in the construction of the adapter 16 and the plastic pipe end 10 including high molecular weight polymers and copolymers such as polyvinyl chloride, polyacrylonitrile, polybutadiene, nylon, polystyrene, polyethylene and polyvinylidine chloride, acetal and polypropylene materials, preferably moldable thermoplastic linear high molecular polymers of ethylinically unsaturated monomers.

The joint is quickly and easily assembled in the field by unskilled workmen and a notably reliable seal is formed therein.

FIGURES 4–5 show a modified embodiment of the joint in FIGURES 1–3 wherein the metal pipe 12 carries a metal coupler 60 with female threads whereas the FIGURE 1 coupler 42 carries male threads. In FIGURE 4, the coupler has a central bore 62.

The metal coupler 60 has a radially inwardly extending shoulder 66, then merging with first, second, and third counterbored portions 68, 70 and 72. This arrangement of counterbored portions includes radial walls 74 and 76 between the first and second counterbored portions 68 and 70, and the second and third counterbored portions 70 and 72, respectively. The adapter 60 is interiorly threaded at 78, adjacent the outer portion of this third counterbored portion 72.

Carried within the metal coupler 60 is an adapter 80 of generally cylindrical construction. This adapter 80 includes a minor diameter portion 82 adapted to be received within the first counterbored portion 68 of the metal coupler 60, terminating at its rearward end with a shoulder having a radial wall 84, this latter radial wall adapted to abut against the radial wall 76 and constituting a stop shoulder arrangement. The adapter 80 also includes a major diameter portion 86, exteriorly threaded at 88 for engagement with the threads 78 of the metal coupler 60. The interior surface 90 of the major diameter portion 86 is outwardly flared and is adapted to receive the plastic pipe end 10, the end surface of which abuts the radial wall 92 opposite the radial wall 84 of the shoulder.

Conveniently, the minor diameter portion 82 has an interior hexagonal shape 94 so that the adapter 80 may be rotated by a cooperatively shaped tool into threaded engagement with the coupler 60 after the coupler 60 is welded to the steel pipe 12. Longitudinal slots extending inwardly of the opposite end of the adapter 80 may perform this same function.

In this embodiment of the invention, an annular space is defined by the radial wall 74 and the second counterbored portion 70 of the metal coupler 60, the opposite radial shoulder 84 and exterior surface of the minor diameter portion 82 of the plastic adapter 80. This space receives an O-ring 96 which is adapted to seal the elements together when the adapter 80 is friction-welded to the plastic pipe end 10. In this embodiment of the invention, the compression of the O-ring is limited by the spaced distance between the radial walls 74 and 84 when the wall 84 of the adapter 80 abuts the radial wall 76 of the metal coupler 60. Thus, the degree of tightness of the threads do not control the effectiveness of the seal but the seal is formed when the plastic adapter 80 abuts against the radial wall 76 of the metal coupler.

It will be apreciated that while this invention discloses a joint which is connected to the end of a steel pipe 12, elements 12, 44 may form a lateral outlet of a T or other such pipe fitting which is well-known in the art. Accordingly, the phrase "metal pipe" is used in a liberal sense to embrace such pipe fittings which lend themselves to the spirit of the instant invention.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. A transition joint for connecting a metal pipe to a plastic pipe comprising in combination: a generally cylindrical plastic adapter including a first smooth bore portion adapted to slidably receive the end of a plastic pipe; a radially inwardly extending shoulder defining an abutment surface at the inner end of said first bore, a second bore extending from said shoulder to the other end of said adapter, said second bore including an interiorly threaded portion, and first, second and third axially extending counterbores, said threaded portion extending from adjacent said shoulder axially to said first counterbore, said first counterbore portion terminating at a radially outwardly extending first radial wall defining the inner end of said second counterbore and said second counterbore terminating at a radially outwardly extending second radial wall defining the inner end of said third counterbore; a metal coupler adapted to be joined at one end to a metal pipe and including at its other end an exteriorly threaded portion of a diameter less than the diameter of said first counterbore portion threadedly engaged with said interiorly threaded portion of said adapter; a smooth exterior surface spaced radially inwardly of said second counterbore extending axially inwardly from the inner end of said exteriorly threaded portion of said coupler to a radially outwardly extending shoulder, said smooth exterior surface including a tapered portion tapering radially outwardly as it extends inwardly from said exteriorly threaded portion and a cylindrical portion merging with said tapered portion, said radially outwardly extending shoulder having an annular radial abutment surface in engagement with said second radial wall of said adapter and a cylindrical exterior surface nested within said third counterbore, the length of said metal coupler between said annular radial abutment surface and said other end thereof being less than the distance between said second radial wall of said adapter and the shoulder from which said second bore of said adapter extends; and a resilient sealing ring in the annular space defined by said first radial wall and said second counterbore of said adapter and said cylindrical portion and said radial abutment surface of said coupler and compressed radially between said second counterbore and said cylindrical portion to form a seal between said adapter and said coupler.

2. Transition joint defined in claim 1 wherein said plastic adapter has an exterior wrench-receiving surface.

3. Transition joint defined in claim 1 wherein the end of said plastic adapter receiving said plastic pipe end is outwardly tapered along the bore thereof to facilitate solvent welding of said plastic pipe to said adapter.

References Cited by the Examiner

UNITED STATES PATENTS

| 2,394,097 | 2/1946 | Parker. | |
| 2,776,151 | 1/1957 | Harkenrider | 285—238 |
| 2,933,428 | 4/1960 | Mueller | 285—423 |
| 3,108,826 | 10/1963 | Black | 285—174 |

CARL W. TOMLIN, *Primary Examiner.*